(12) United States Patent
Starke et al.

(10) Patent No.: US 11,321,895 B2
(45) Date of Patent: May 3, 2022

(54) NEURAL STATE MACHINE DIGITAL CHARACTER ANIMATION

(71) Applicant: Adobe Inc., San Jose, CA (US)

(72) Inventors: Wolfram Sebastian Starke, Seattle, WA (US); Jun Saito, Seattle, WA (US)

(73) Assignee: Adobe Inc., San Jose, CA (US)

( * ) Notice: Subject to any disclaimer, the term of this patent is extended or adjusted under 35 U.S.C. 154(b) by 54 days.

(21) Appl. No.: 16/888,167

(22) Filed: May 29, 2020

(65) Prior Publication Data

US 2021/0375021 A1   Dec. 2, 2021

(51) Int. Cl.
*G06T 13/00* (2011.01)
*G06T 13/40* (2011.01)
*G06N 3/04* (2006.01)
*G06T 13/80* (2011.01)

(52) U.S. Cl.
CPC .......... *G06T 13/40* (2013.01); *G06N 3/0472* (2013.01); *G06T 13/80* (2013.01)

(58) Field of Classification Search
CPC ......... G06T 13/40; G06T 13/00; G06T 13/80; G06T 13/20; A63F 13/10
USPC ....................................................... 345/473
See application file for complete search history.

(56) References Cited

U.S. PATENT DOCUMENTS

2019/0303658 A1* 10/2019 Ando ............... G06N 3/08
2019/0381404 A1* 12/2019 Buttner ............ G06T 13/00
2020/0222804 A1*  7/2020 Cappello ......... G06T 13/40

OTHER PUBLICATIONS

Agrawal,"Task-based Locomotion", Jul. 2016, 11 pages.
Al-Asqhar,"Relationship Descriptors for Interactive Motion Adaptation", Jul. 2013, pp. 45-54.
Bai,"An Empirical Evaluation of Generic Convolutional and Recurrent Networks for Sequence Modeling", Apr. 19, 2018, 14 pages.
Chang,"ShapeNet: An Information-Rich 3D Model Repository", Dec. 9, 2015, 11 pages.
Choi,"Deformable Motion: Squeezing into Cluttered Environments", Apr. 2011, 9 pages.
Choi,"Planning Biped Locomotion using Motion Capture Data and Probabilistic Roadmaps", ACM Transactions on Graphics, vol. V, No. N, Oct. 2002, pp. 1-25.
Clegg,"Learning to Dress: Synthesizing Human Dressing Motion via Deep Reinforcement Learning", Nov. 2018, 10 pages.
Clevert,"Fast and Accurate Deep Network Learning by Exponential Linear Units (ELUs)", ICLR 2016, Feb. 22, 2016, 14 pages.
Fragkiadaki,"Recurrent Network Models for Human Dynamics", Sep. 29, 2015, 9 pages.
Ha,"HyperNetworks", Dec. 1, 2016, 29 pages.

(Continued)

*Primary Examiner* — Gordon G Liu
(74) *Attorney, Agent, or Firm* — FIG. 1 Patents

(57) ABSTRACT

Digital character animation automated generation techniques are described that are implemented by an animation generation system via a computing device. These techniques enable the animation generation system to generate an animation of a digital character automatically and without user intervention responsive to a user input of a target action such that the digital character is capable of performing a complex set of actions in a precise and realistic manner within an environment contained within digital content, e.g., an animation as part of a digital video.

20 Claims, 9 Drawing Sheets
(5 of 9 Drawing Sheet(s) Filed in Color)

(56) References Cited

OTHER PUBLICATIONS

Harvey, "Recurrent Transition Networks for Character Locomotion", Jan. 17, 2019, 11 pages.
Heess, "Emergence of Locomotion Behaviours in Rich Environments", Jul. 10, 2017, 14 pages.
Holden, "A Deep Learning Framework for Character Motion Synthesis and Editing", May 2016, 11 pages.
Holden, "Phase-Functioned Neural Networks for Character Control", Jul. 2017, 13 pages.
Jacobs, "Adaptive Mixtures of Local Experts", Mar. 1991, pp. 79-87.
Kry, "Tiling Motion Patches", May 2013, 10 pages.
Lee, "Interactive Character Animation by Learning Multi-Objective Control", Nov. 2018, 10 pages.
Lee, "Interactive Control of Avatars Animated with Human Motion Data", ACM SIGGRAPH '02, Jul. 2002, 10 pages.
Lee, "Motion Patches: Building Blocks for Virtual Environments Annotated with Motion Data", Jul. 2006, 9 pages.
Liu, "Sampling-based Contact-rich Motion Control", SIGGRAPH '10, Jul. 2010, 10 pages.
Lo, "Learning Motion Controllers with Adaptive Depth Perception", Jul. 2012, 10 pages.
Lo, "Real-Time Planning for Parameterized Human Motion", Jul. 2008, 10 pages.
Min, "Motion Graphs++: a Compact Generative Model for Semantic Motion Analysis and Synthesis", Nov. 2012, 12 pages.
Mordatch, "Discovery of Complex Behaviors through Contact-Invariant Optimization", Aug. 2012, 8 pages.
Mukai, "Geostatistical Motion Interpolation", Jul. 2005, 9 pages.
Peng, "DeepLoco: Dynamic Locomotion Skills Using Hierarchical Deep Reinforcement Learning", Jul. 2017, 16 pages.
Peng, "DeepMimic: Example-Guided Deep Reinforcement Learning of Physics-Based Character Skills", Jul. 27, 2018, 18 pages.
Peng, "SFV: Reinforcement Learning of Physical Skills from Videos", Nov. 2018, 17 pages.
Peng, "Terrain-Adaptive Locomotion Skills Using Deep Reinforcement Learning", May 2016, 15 pages.
Qi, "PointNet++: Deep Hierarchical Feature Learning on Point Sets in a Metric Space", Jun. 2017, 10 pages.
Rose, "Verbs and Adverbs: Multidimensional Motion Interpolation Using Radial Basis Functions", Sep. 1998, 17 pages.
Safonova, "Construction and optimal search of interpolated motion graphs", Aug. 2007, 11 pages.
Shum, "Interaction Patches for Multi-Character Animation", Dec. 2008, 9 pages.
Villegas, "Neural Kinematic Networks for Unsupervised Motion Retargeting", Apr. 2018, pp. 8639-8648.
Wang, "Gaussian Process Dynamical Models for Human Motion", Mar. 2008, 37 pages.
Won, "Generating and Ranking Diverse Multi-Character Interactions", Nov. 2014, 12 pages.
Won, "How to Train Your Dragon: Example-Guided Control of Flapping Flight", Nov. 2017, 12 pages.
Ye, "Synthesis of Detailed Hand Manipulations Using Contact Sampling", Apr. 2012, 10 pages.
Yu, "Learning Symmetric and Low-Energy Locomotion", May 12, 2018, 12 pages.
Zhang, "Mode-Adaptive Neural Networks for Quadruped Motion Control", Aug. 2018, 11 pages.
Zhao, "Robust Realtime Physics-based Motion Control for Human Grasping", Nov. 2013, 12 pages.
Zhou, "Auto-Conditioned Recurrent Networks for Extended Complex Human Motion Synthesis", Jul. 9, 2018, 13 pages.

* cited by examiner

NEURAL STATE MACHINE DIGITAL CHARACTER ANIMATION

BACKGROUND

Conventional digital animation systems may be used to generate animations of digital characters as performing actions within a virtual environment. For example, conventional systems may support generation of animations in which a digital character appears to walk or run. Digital characters may include a variety of different objects and shapes, examples of which include humanoid shapes (e.g., humans, robots, cartoon characters) and non-humanoid shapes, e.g., animals, objects such as a beach ball and cars, rain, smoke, and so forth.

However, conventional digital animation systems used to generate animations by a computing device suffer from numerous challenges. Conventional digital animation systems, for instance, are typically limited as part of automated animation generation to a single type of action having similar cyclic behavior, e.g., to walk, run, and so forth in which an action is repeated. Further, conventional digital animation systems are typically limited to representation of these actions in a single type of environment, e.g., walking along a surface. Thus, conventional digital animation systems as part of automated animation generation are incapable of addressing complex actions involving multiple actions and/or objects and are not capable of addressing a variety of environments in which these actions may be performed. As such, complex actions and environments are limited to manual specification by a user, which is tedious and computationally inefficient as requiring repeated and complex manual inputs by sophisticated users having specialized knowledge that are then manually corrected through interaction with the computing device in order to look realistic.

SUMMARY

Digital character animation techniques are described that are implemented by an animation generation system via a computing device. These techniques enable the animation generation system to generate an animation of a digital character automatically and without user intervention responsive to a user input of a target action such that the digital character is capable of performing a complex set of actions in a precise and realistic manner.

In one example, an input is received by an animation generation system as selecting a target action to be performed by a digital character as part of an animation, e.g., within a digital three-dimensional scene. Specification of the target action may also include a location within the scene and/or target object, e.g., walk toward a table, or as a complex series of actions, e.g., to walk to a specific location and stand there.

In response to the input, the animation generation system generates the animation automatically and without user intervention. To do so, a first state is determined from a first frame of an animation, e.g., a current frame being displayed. The first state describes an action associated with a digital character. In the first state, for instance, the digital character may be a virtual human standing (e.g., idle) in an upright position in the center of a room (e.g., virtual environment in a digital 3D scene) with a target object (e.g., table) located adjacent to the character.

From the first state and the specified target action, the animation generation system generates additional frames of the animation to transition the digital character from the first state to complete the target action, e.g., as a series of intermediate frames until a final frame completing the target action is generated. The intermediate frames may involve additional actions (e.g., walking) and associated motions (e.g., movement of arms and legs) performed by the digital character. In an example in which the target action involves sitting, the actions may include a transition from a first state involving an idle action, to a walking action, to a sitting action associated with a target action. In this way, the action in the first frame and the additional action of walking support different motion types together, which is not possible in conventional techniques limited to a single motion type.

To do so, a neural state machine of the animation generation system is employed. The neural state machine includes a gating module and a motion prediction module. The gating module is implemented by a neural network to generate blending coefficients of weights based on phase values of phases of motion corresponding to the first state and the target action. Phases of motion indicate a distinct period or stage in a series of motions. Phases of motion for a leg movement involved in a walking action, for instance, may include initial placement of a leg on a surface, lifting of the leg, movement of the leg forward, and so on. This may also be based on orientation, trajectory, and so forth.

The blending coefficients of weights are then used to configure neural network parameters (e.g., weights between nodes) for a motion prediction module of the animation generation system. The motion prediction module, once configured, is then used to predict a second state based on the input features, e.g., the phase values of the phases of motion corresponding to the first state of the first frame and the target action. The input features may also include trajectories, locations, specification of digital objects within an environment in which the animation is to be implemented, and so on.

Use of phases of motion and the blending coefficients of weights to configure the motion prediction module enables the animation generation system to generate an animation in which the digital character performs complex actions, i.e., multiple actions and/or actions involving digital objects. In this way, the system ensures that the actions performed by the digital character are realistic through an ability to address phases of motion as well as the motions, objects, and/or environment together. The second state is then used to generate a second frame of the animation. The second state is also used as an input to the neural state machine to generate a third state for a third frame, and so on in order to complete generation of the animation. In this way, the animation generation system generates an animation based on a specified target action in which the digital character performs a series of complex actions in a precise and realistic manner which is not possible in conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The detailed description is described with reference to the accompanying figures. Entities represented in the figures may be indicative of one or more entities and thus reference may be made interchangeably to single or plural forms of the entities in the discussion.

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
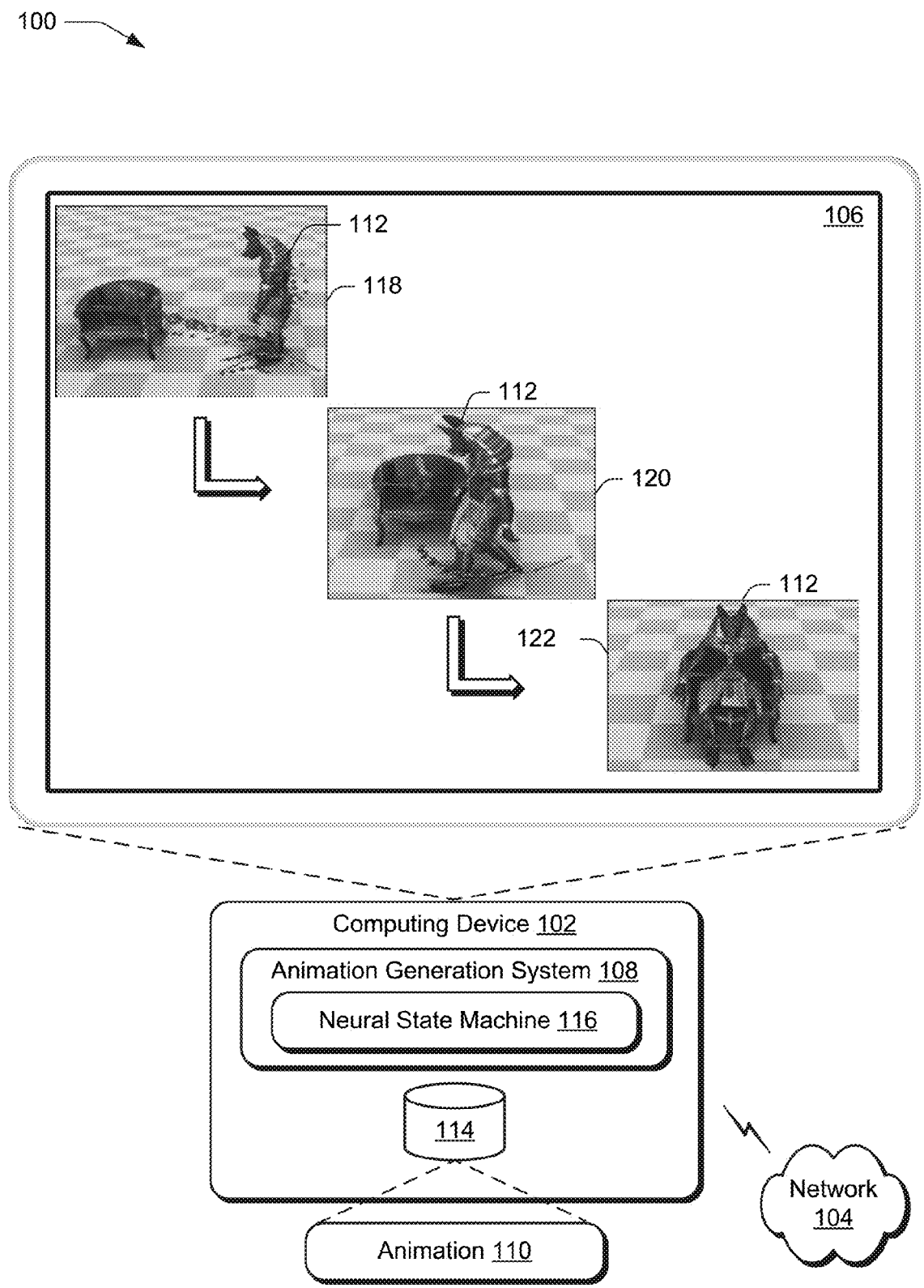
FIG. 1 is an illustration of an environment in an example implementation of the animation generation system that is operable to generate animations using the neural network described herein.

Conventional digital animation generation systems are faced with numerous challenges associated with generating animations of digital characters that result in unrealistic animations. As previously described, conventional systems are typically limited to a single type of cyclical motion as part of automated animation generation and therefore complex actions and complex motions forming those actions, a digital object, and/or targets are limited to manual user interaction. Conventional systems also fail to support techniques that enable the digital character to effectively learn from these actions and adapt the actions and associated motions to other virtual environments or different objects within a virtual environment.

Further, conventional systems are incapable of addressing a phase of motion for a particular action nor multiple actions simultaneously and thus are incapable of addressing transitions between these actions, e.g., from idle to walking to sitting in a chair. Conventional systems also have inefficiencies that cause delays in various actions performed by digital character, and in transitions between actions, which adversely affects the precision and realistic appearance of these actions.

Accordingly, techniques and system are described herein that support automated generation of an animation in which a digital character may perform a complex set of actions within a virtual environment (e.g., a digital 3D scene), e.g., an augmented reality environment in which the objects are physical objects or a virtual reality environment in which the objects do not exist physically. Moreover, these techniques enable the system to learn from these actions and adapt the actions dynamically to a virtual environment by addressing phases of motions that form the actions such that the character's actions are precise and realistic with respect to that environment.

In one example, the animation generation system receives an input specifying a target action to be performed by a digital character. A user, for instance, may select a representation of the target action in a user interface, provide a spoken utterance, gesture, and so forth. Additionally, the target action may be defined with respect to a target object. The target action, for instance, may involve a command for the digital character to walk from a source location within an environment of the animation to sit at an object at a destination location within the environment. Other variations of such a command are also contemplated.

In response, a determination module of the animation generation system determines a first state of the digital character within a first frame to be used as part of the animation, e.g., a current frame output in the user interface. The first state as included in a first frame of digital content describes an action and characteristics of the action associated with the digital character, e.g., a virtual human performing an action of sitting, standing, walking, running, interacting with an object, and so forth.

From this, data describing the first state of the digital character in the first frame and the data describing the target action are used to determine input features by the determination module of the animation generation system. The input features may include action labels (e.g., a type of action to be performed such as sit, walk, etc.) and phase values of phases of motion corresponding to the first frame and the target action. In this way, the input features reference relevant actions and phases of motion involved in those actions. The input features may also describe other digital objects within a digital environment, orientations associated at the first state and the target action, trajectories between the first state and the target action, and so on.

Data defining the phase of motion of the digital character in the first state, for instance, may be encoded as a two-dimensional vector (e.g., a phase of motion vector) along with data describing the type of action in the first frame, e.g., in a "one hot" encoding technique. The phase describes a distinct period or stage in a series of motions involved in the action. The phase of motion, for instance, may be expressed using values such as "0," "$\pi$," "$2\pi$" for a corresponding motion involved in an action, e.g., movement of a foot as part of walking. These values may include temporal markers that correspond to time periods within a frame in which the digital character performs corresponding actions and motions involving those actions.

The phase of motion, for instance, may correspond to a particular time within a frame in which a digital character's left foot lands on the ground in the digital content, and another time within the frame when the digital character's right foot lands on the ground. This overcomes conventional techniques that are limited to cyclic motions using binary indicators (e.g., the cyclic motion does or does not occur) but does not address phases of those motions as they occur, i.e., the distinct period or stage in a series of motions involved in the action. In this way, the techniques described herein may address multiple actions and transitions between those actions and motions and relationships of these actions and motions together (e.g., transitioning from idle to walking), which is not possible in conventional techniques.

Input features, as described above, may also define a goal position as a location within an environment of the animation at which the target action is to be performed. A goal orientation may be used to describe a direction of the digital character relative to a location within the environment at which the target action is to be performed, and so on. Thereafter a Kronecker product operation is performed in one example using these two-dimensional vectors to define the input features. The input features are then output by the determination module to a neural state machine of the animation generation system.

The neural state machine of the animation generation system in this example includes a gating module and a motion prediction module. The input features received by the neural state machine are first used by the gating module to generate blending coefficients of weights. The blending coefficients of weights are used to set neural network parameters (e.g., weights of connections between nodes of a neural network) to configure the motion prediction module in order to generate the second state. To do so, the gating module employs a neural network that receives the input features. As described above, the input features may include action labels (e.g., defining a type of action performed such as idle, walk, sit, climb, etc.) and phase values of phases of motion corresponding to the first state and the target action as described above.

In response, the gating module outputs blending coefficients of weights that are then used to configure the motion prediction module to generate a second state as further described below. The blending coefficients of weights are then used to configure a motion prediction module. The motion prediction module, once configured, is employed to process the input features, output of which is a predicted second state for the digital character in a subsequent frame of the animation. The motion prediction module, for instance, may receive data that describes the digital character as standing in one corner of a virtual environment (e.g., a room) surrounded by various objects, and the target object (a chair) being in the other corner of the room. The motion prediction module may also receive data that the target action to be performed by the digital character, e.g., "sit in the chair."

Based on the input features, the motion prediction module predicts that in the second state in the second frame of the animation (e.g., an intermediate second state of the digital character) that the digital character is to take a forward step towards the chair located in the other corner of the room. In one example, assume that the motion prediction module is implemented as a single linear layer of a neural network:

$$\text{output} := (W \cdot \text{input}) + b$$

where the operation for W and input is a matrix-vector product. During operation, the motion prediction network parameters W and b are computed on-the-fly as the linear blending of N experts:

$$W := a0*W\_ex0 + a1*W\_ex1 + a2*W\_ex2 \ldots aN*W\_exN$$
$$b := a0*b\_ex0 + a1*b\_ex1 + a2*b\_ex2 \ldots aN*b\_exN$$

The blending coefficients (a0 . . . aN) are the output of the gating network. Expert parameters (W_ex0 . . . W_exN, b_ex0 . . . b_exN) are optimized during the training and are fixed during operation in order to make the prediction as further described below.

In an implementation, the second state is predicted in a bi-directional manner from an egocentric viewpoint of the digital character at the first state and a viewpoint of the target action and therefore improves prediction accuracy and consistency in achieving the desired target action. Other example actions performed by the digital character are also contemplated. Such a prediction, as based on the blending coefficients, ensures that the movement of the digital character is precise and realistic and the direction in which the character moves is accurate through an ability to support complex actions and objects included within an environment of the digital content.

In this way, the blending coefficients of weights as used to configured the motion prediction module may address a plurality of different types of motions and associated characteristics (e.g., objects and the environment) as part of transitioning from the first state to performance of the target action. As a result, the digital character's actions do not appear blurry or delayed through multi-modal support of different motions types as part of complex actions.

An animation is then generated by the animation generation system by generating a second frame depicting the digital character in the second state, the process of which may be repeated in which this second state is used as a basis to generate a third successive state and so on until the target action is achieved. As a result, the animation may support multiple concurrent actions, actions with respect to digital objects, and so on by addressing phases of motion of respective actions and use of blending coefficients, which is not possible in conventional techniques. Further discussion of these and other examples is included in the following sections.

Example Environment

FIG. 1 is an illustration of an environment 100 in an example implementation of an animation generation system that is operable to generate animations automatically and without user intervention (i.e., automated) using a neural state machine described herein. The illustrated environment 100 includes a computing device 102 communicatively coupled with a network 104 and outputting a user interface 106 although other examples are also contemplated.

The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud" via the network 104 as further described in FIG. 7.

An animation generation system 108 is implemented by the computing device to generate an animation 110 of a digital character 112, which is illustrated as stored in a storage device 114. In one example, the animation generation system 108 receives an input specifying a target action to be performed by a digital character as part of the animation 110, e.g., with respect to a target object included in digital content. In the illustrated example, a first frame 118 includes a digital character 112 (depicted as having the head of a dog and body of a human) standing a short distance away from a chair, i.e., an example target object. While this figure describes an animation based on a target action performed by the digital character with respect to an example target object, various other target action examples are also contemplated that do not involve a digital object, e.g., multiple target actions to be performed concurrently within a respective frame to achieve a target action such as transition from idle to walking to sitting. When this first frame appears on the user interface 106, a user provides an input (e.g., through a "tap" gesture or a "click" operation on the interface, spoken utterance, and so on) for the digital character to sit in the chair.

From this, the animation generation system 108 determines input features that are processed by the neural state machine 116 of the animation generation system 108 in order to generate a second frame 120 of the animation 110, e.g., an intermediate frame between the first input frame and a frame at which the target action is completed. As further described in relation to FIG. 2, the neural state machine 116 may include a gating module that is used to generate blending coefficients of weights that are then used to configure neural network parameters of a motion prediction module to process data describing the first state and the target action in order to predict a second state of the digital character 112.

These input features are determined by the animation generation system 108 based on first state of the first frame and the target action. As illustrated in FIG. 1, the neural state machine 116 generates blending coefficients of weights based on the example digital character 112 standing upright and being located a short distance away from the chair, and the position and orientation of the chair with respect to the example digital character 112. The position relates to a virtual distance between the example digital character 112 and the chair, and the orientation describes a direction of the digital character relative to the location at which the target action is to be performed. In this example, the orientation describes a direction of the digital character 112 relative to the target object (e.g., digital character may be located diagonally with respect to the target object and would have to turn slightly to the right in order to approach the chair).

The blending coefficients of weights are used to configure another neural network of the neural state machine 116 implemented by a motion prediction module to process the input features including motions and corresponding characteristics (e.g., environmental geometry, digital objects, etc.) on achieving the desired target action. Blending the coefficients of weights ensures that the multiple actions performed by the example digital character 112 and motions involving those actions in a particular frame are addressed together by the motion prediction module and as such are precise and realistic, i.e., performance of actions are addressed together.

Figure 2:
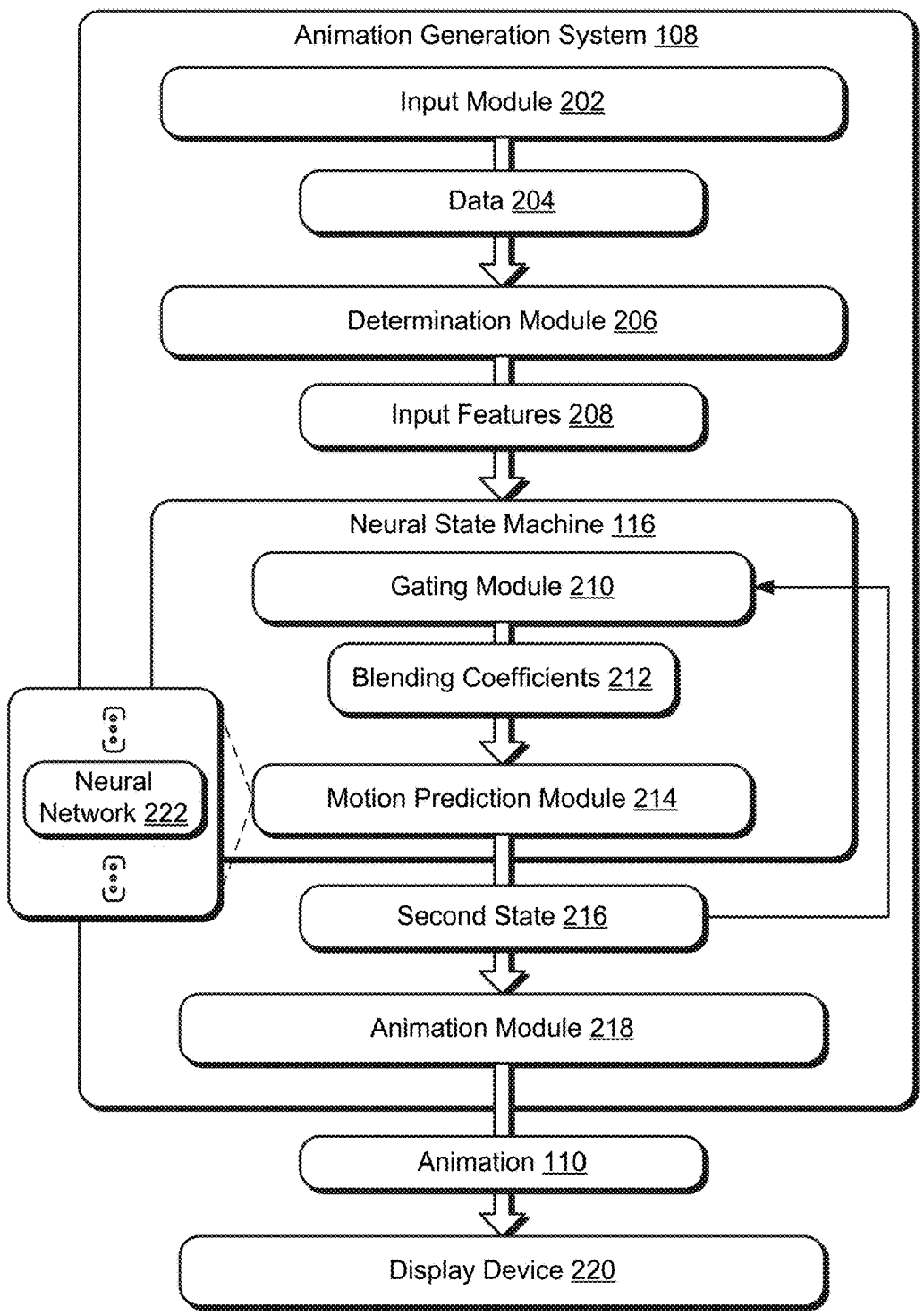
FIG. 2 depicts a system in an example implementation showing operation of the animation generation system described herein.

Based on this, the neural state machine 116 predicts a second state for the digital character in a second frame 120 of the animation 110, e.g., through use of a motion prediction module configured using the blending coefficients as shown in FIG. 2. In the illustrated example of FIG. 1, the neural state machine 116 predicts that the example digital character 112 is to take a forward step in a direction parallel to the chair as part of the animation 110 based on data that indicates that the chair is located in front of the character and a short virtual distance to the right of this character, and that the character's pose is such that the character is standing upright and facing the chair. As such, the neural state machine 116 predicts that the second state in the example second frame 120 for the digital character in order to achieve the target action is to walk forward towards the chair.

From this, the animation generation system 108 generates the second frame 120 of the animation 110 in which the example digital character 112 has the example second state, and outputs the animation 110 for display in the user interface 106 of the computing device 102. The data output from the neural state machine 116 (e.g., data relating to the predicted second state of the example digital character 112 in the example second frame 120) may then be used by the animation generation system 108 to generate new input features with respect to the next frame, i.e., a third frame 122. For example, data relating to the phase of motion of the second frame 120, the action associated with the digital character 112 in the second frame 120 are used by the animation generation system 108 to determine new input features.

These new input features are input into the neural state machine 116 to enable the neural state machine 116 to predict another state (e.g., a third state) for the character in an example third frame 122. In an implementation, each frame-to-frame prediction from a particular current frame (e.g., a first frame) to the next frame (e.g., a second frame) and so on (e.g., a third frame) is an independent prediction. Specifically, each prediction of a next frame generated by the animation generation system 108 that follows a current frame may be based on new inputs received by the system associated with that current frame.

In FIG. 1, the neural state machine 116 utilizes the data describing the example digital character 112 in the second state in the second frame 120 to again generate blending coefficients and configure the motion prediction module to predict another state (the third state) for the example digital character 112 in a third frame 122 that follows the second frame 120. In the illustrated example, the neural state machine 116 predicts that the third state in the example third frame 122 causes the digital character 112 to appear as sitting in the chair. Thus, this process is repeated for subsequent frames, e.g., the second state serves as a basis to generate a third state for a third frame, and so on until the target action is completed by the digital character 112. As such, the digital character 112 appears to walk forward in the direction of the chair in this example. The animation 110 may be stored in storage device 114 of the computing device 102, rendered in a user interface 106 of a display device, and so on.

In this way, the animation generation system 108 leverages the neural state machine 116 to predict a series intermediate actions and transitions between actions for the example digital character 112. These intermediate actions (appearing across multiple frames) and motions involved in achieving those actions result in the generation of an animation in which the example digital character 112 performs a complex set of actions in a precise and realistic manner.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Neural Network Based Digital Character Animation Generation

Figure 3:
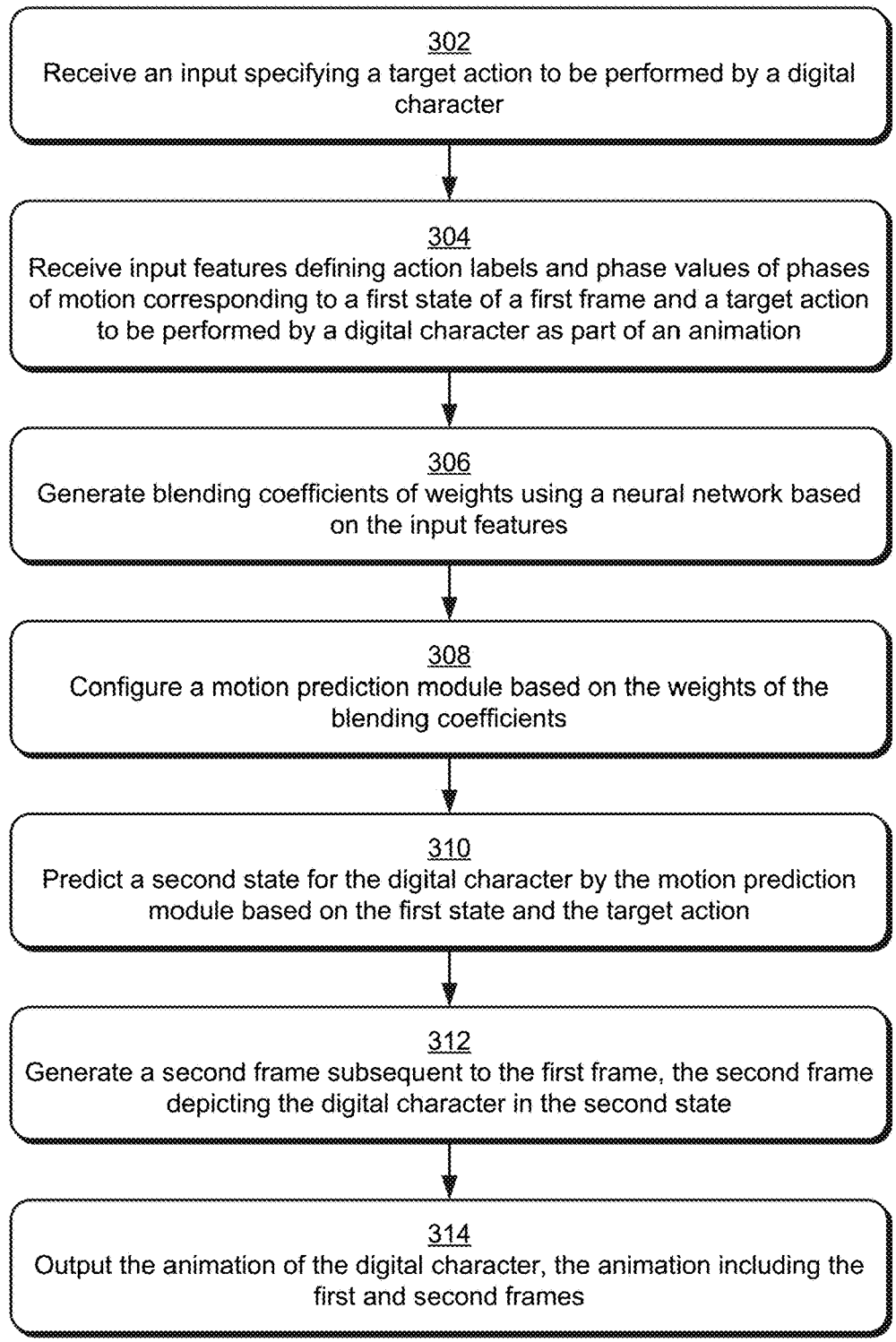
FIG. 3 is a flow diagram depicting a procedure in an example implementation in which the animation generation system described herein is used to generate an animation of a digital character performing a target action.
Figure 4:
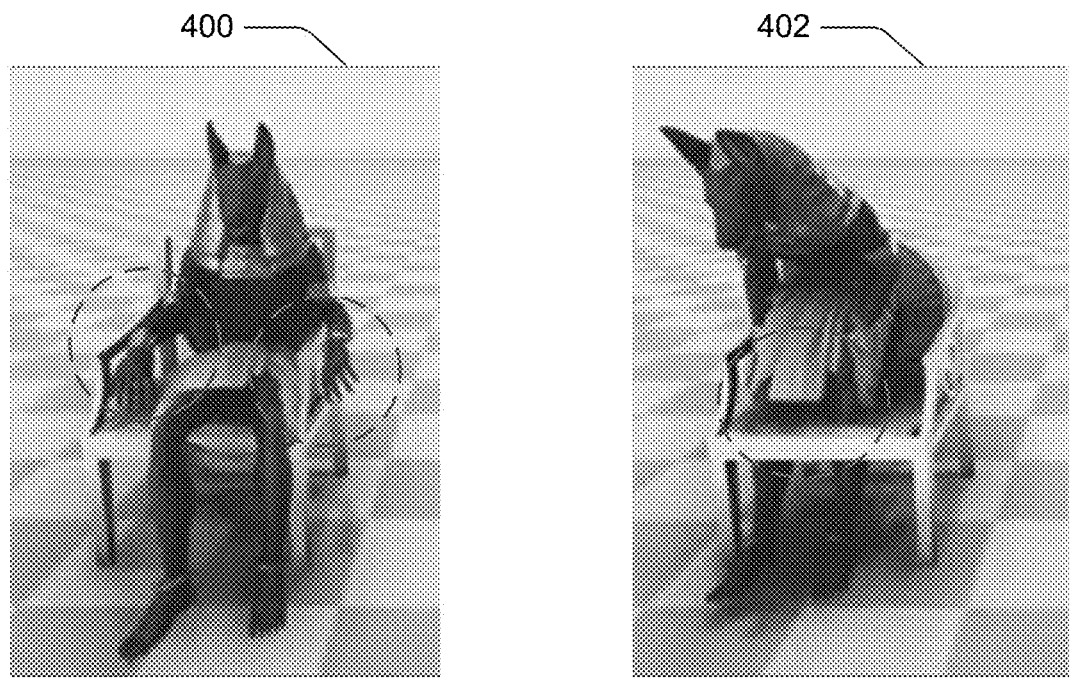
FIG. 4 depicts some problems in conventional animation generation techniques.
Figure 4:
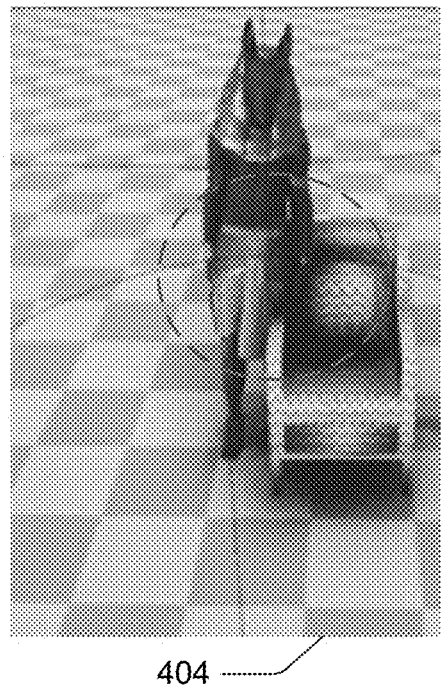
Figure 5:
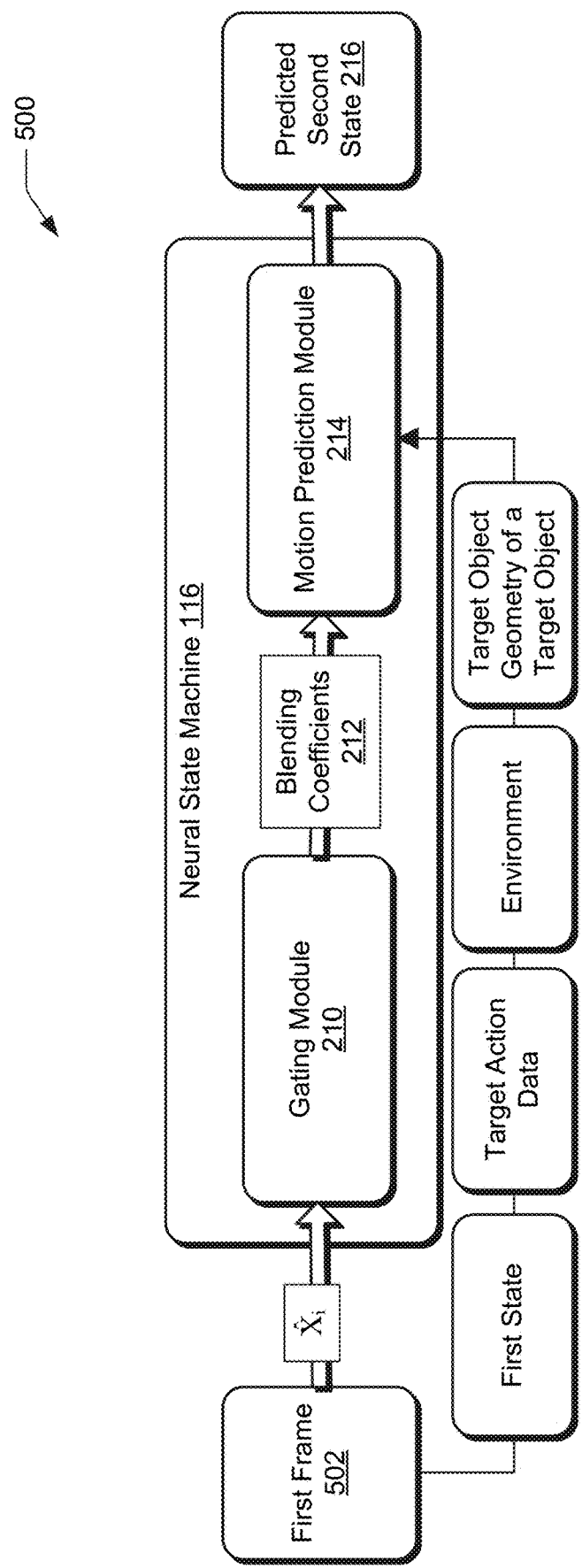
FIG. 5 depicts in detail the manner in which the components of the neural network of the animation generation system generate an animation in which a digital character to performs a target action.
Figure 6A:
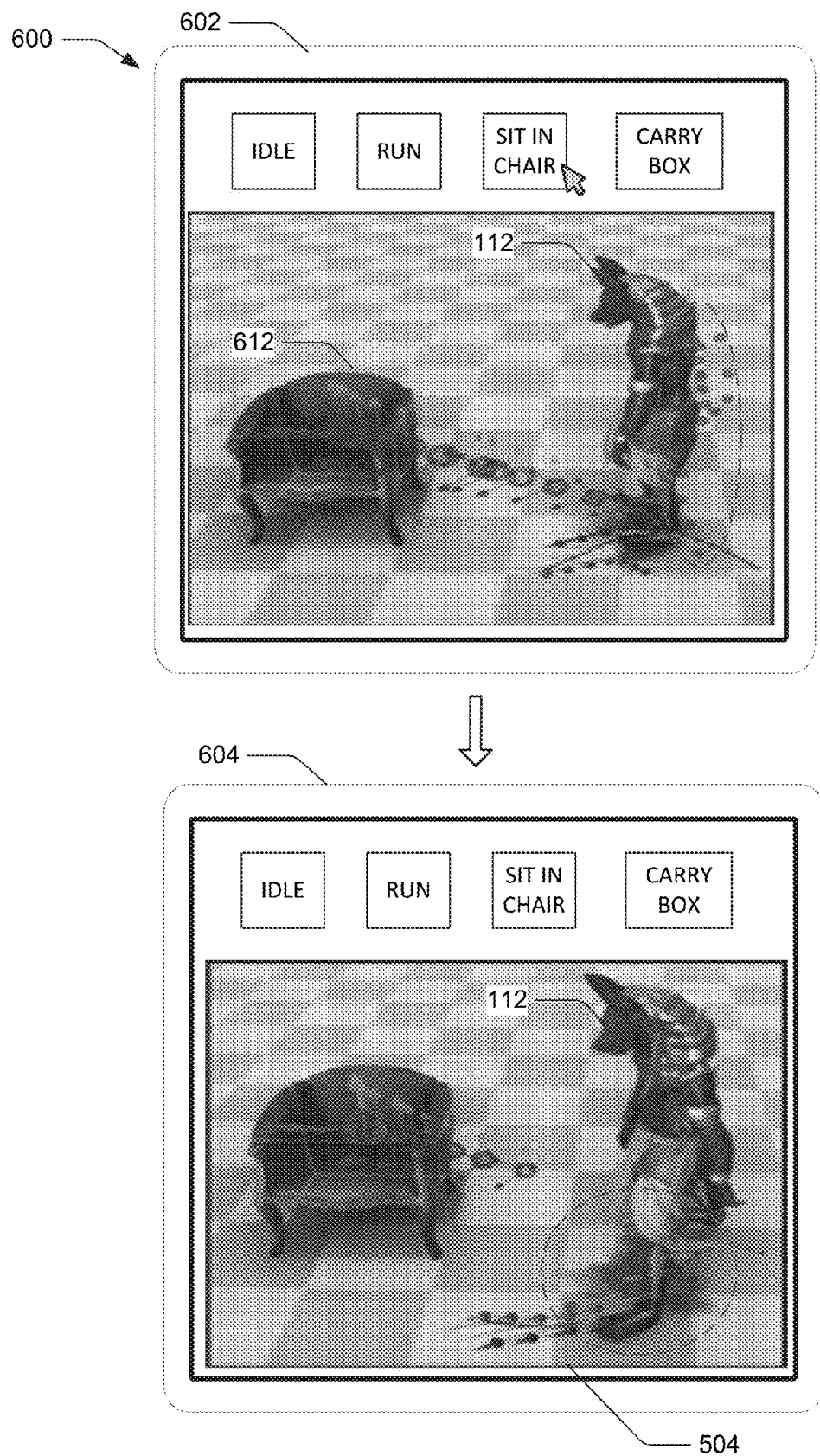
FIGS. 6A-6C depicts a target action being performed by a digital character with respect to a target object that is included in a virtual environment in digital content.
Figure 6B:
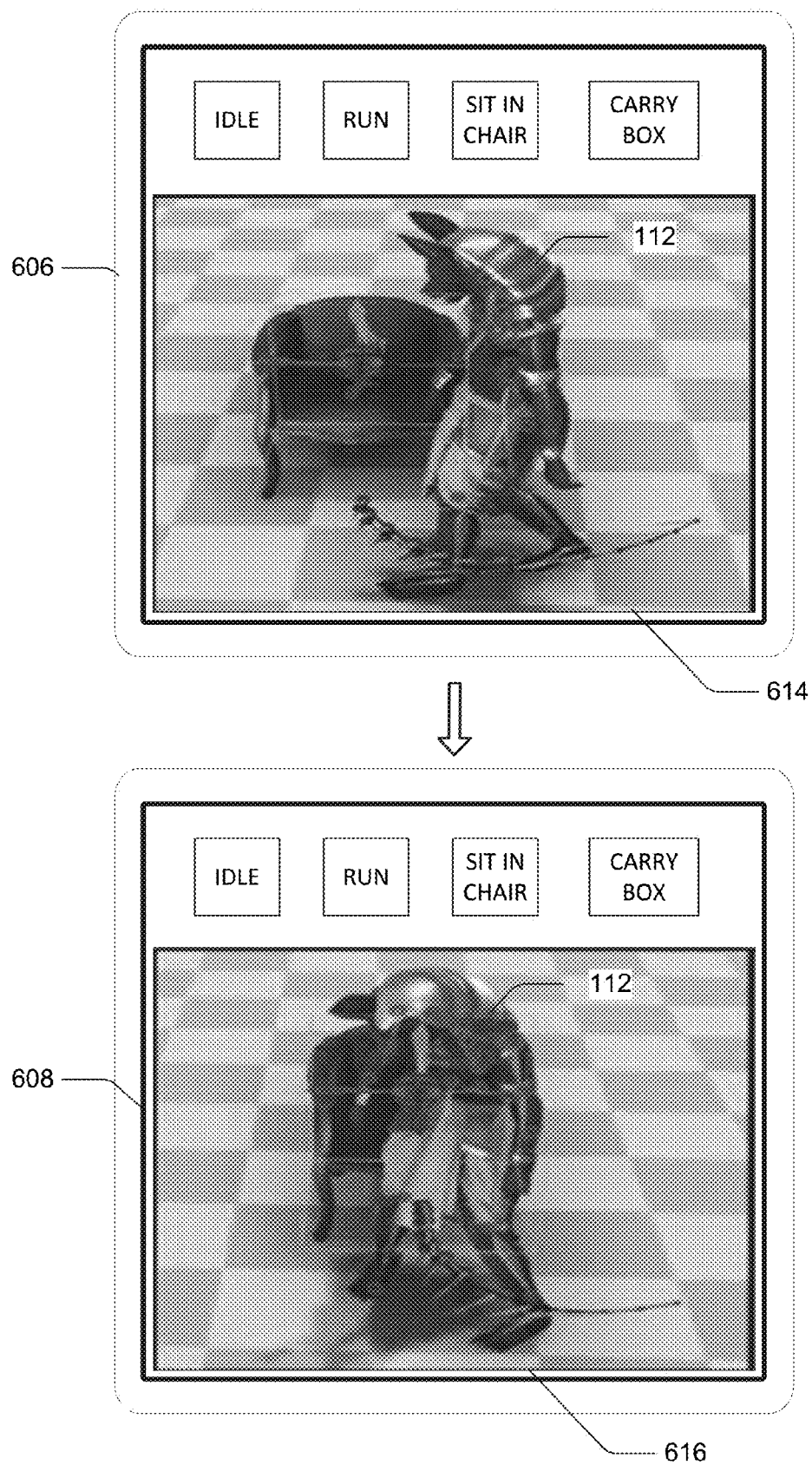
Figure 6C:
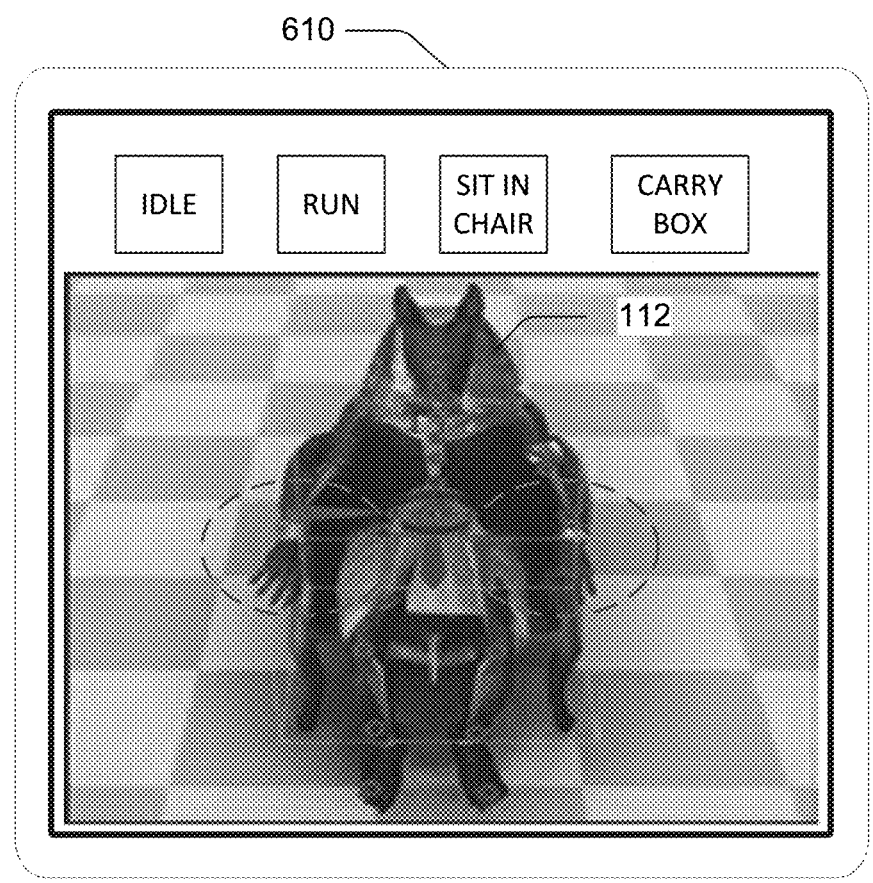

FIG. 2 depicts a system 200 in an example implementation showing operation of the animation generation system 108 described herein. FIG. 3 is a flow diagram depicting a procedure 300 in an example implementation in which the animation generation system 108 described herein is used to generate an animation 110 of a digital character performing a target action. FIG. 4 depicts challenges in conventional animation generation techniques. FIG. 5 depicts components of the neural state machine 116 of the animation generation system as generating an animation 110 in which a digital character to performs a target action. FIGS. 6A-6C depict an example 600 of the animation generation system 108 generating an animation of a digital character based on user input specifying an action to be performed by the digital character. Example 600 is shown in first, second, third, fourth, and fifth stages 602, 604, 606, 608, and 610 in FIGS. 6A through 6C.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference may interchangeably be made to FIGS. 2-6C.

Prior to describing the operation of the animation generation system 108, describing the challenges of conventional animation generation techniques, as depicted in FIG. 4, is instructive. In FIG. 4, frame 400 shows a digital character whose arms are not precisely aligned with the armrest of the chair. As depicted, the character's left forearm is shown as resting in the air without support and the right arm is shown as resting a short distance away from the armrest. Frame 402 shows the digital character's legs going through the seat of the chair. Finally, frame 404 shows the digital character as walking through a portion of the chair. As such, these conventional learning-based animation generation techniques are imprecise. The animation generation system 108 described herein addresses and overcomes these challenges to support complex actions.

To begin, an input module 202 of the animation generation system 108 receives an input specifying a target action to be performed by a digital character 112 (block 302). The selection may be input in a variety of ways, e.g., through a "tap" gesture or a "click" operation performed on an icon that is displayed on a user interface of the computing device 102, a spoken utterance, gesture, and so forth.

As illustrated at the first stage 602 of FIG. 6A, for instance, the user interface 106 includes representations of various target actions that can be performed by the digital character 112, e.g., depicted as icons labeled "IDLE," "RUN," "SIT IN CHAIR," "CARRY BOX." The user interface 106 also displays a virtual environment (e.g., a room) including the digital character 112, a target object 612 (a chair) that is included in the room, and a plurality of other objects (not shown) that are to be included as part of the animation 110. Depending on the type of action, the digital character 112 may interact with one or more of these objects within the environment. Alternatively, as stated, the target action does not involve a target object. The target action, for instance, may include a command for the digital character 112 to walk from a source location to a destination location within the environment. Other variations of such a command are also contemplated.

The "IDLE" action is when the digital character 112 maintains a single physical position (e.g., a standing-upright posture) for a predetermined period of time. The "RUN" action may involve the digital character 112 running across a portion of a room, and the action of "CARRY BOX" may involve the digital character 112 walking towards a box located within the room included in the digital content, stopping in front of the box, and picking it up.

As depicted at first stage 602, a selection is received of the icon labeled "SIT IN CHAIR." Responsive to the selection, the animation generation system 108 generates an animation 110 automatically and without user intervention that includes the digital character 112 as performing a series of intermediate actions and motions as part of those actions that end in the digital character 112 sitting on the target object 612 (the chair), i.e., the target action. These intermediate actions may include actions of walking or running from a stationary position towards the chair, and sitting on it. These intermediate actions may also involve motions performed by the digital character in order to achieve the actions, e.g., movement of feet and swinging of arms to achieve the action of "walking." The manner in which the animation generation system 108 generates, upon receiving the user input specifying a target action, an animation 110 of the digital character 112 is described in greater detail in the following paragraphs.

FIG. 5 is an illustration depicting the components of the neural state machine 116 and the manner in which these components receive data related to a first state 208 of the digital character 112 from a first frame 502 of the animation 110. This is used by the animation generation system 108 to predict a second state 216 for the digital character in order to generate a second frame of the animation 110.

After receiving an input specifying a target action to be performed by the digital character 112 (e.g., with respect to a target object 612), a determination module 206 of the neural state machine 116 is employed to generate a plurality of input features 208 based on the first state.

In one example, the first frame 502 as shown at the first stage 602 of FIG. 6A includes the digital character 112 in a stationary position located at a certain distance away from the target object 612 (e.g., chair) in a virtual environment. Based on the position of the digital character 112 within the virtual environment, input features 208 from the first frame 502 are determined by the determination module 206.

In one example, the determination module 206 determines the input features 208 based on a phase of motion of the digital character 112 in the first frame 502, the action associated with the digital character 112 in the first frame (e.g., an action being performed by the digital character in this iframe), and the target action. The target action may include a goal position and goal orientation of the digital character as part of the target action. The target action may also include interaction of the digital character 112 with a target object 612. An example of the manner in which the determination module 206 determines the input features 208 is described in detail in the following paragraphs.

The input features 208 are defined by the term Xi, which is computed using the following equations:

$$\hat{X}_i = P_i \otimes X'_i$$

$$P_i = \{\sin(p_i), \cos(p_i)\} \in R^2$$

$$X'_i = \{t_{i-1}{}^a, g_{i-1}{}^a, \delta \cdot g_{i-1}{}^a, \theta \cdot g_{i-1}{}^a\} \in R^2$$

In the first of the above equations, the term $\hat{X}_i$ represents input features 208 that are to be determined for corresponding frames of the animation. The determination module 206 may determine these input features 208 by performing a Kronecker dot product of the values represented by the terms $P_i$ and $X'_i$. The term $P_i$ is a two-dimensional vector (e.g., a phase of motion vector) into which data describing a phase of motion of the digital character 112 in the first state as included in the first frame 502 is encoded. The term $P_i$ is calculated from a two-dimensional scalar value represented by the labeled "$p_i$." This term, as shown in the second of the above equations, represents a phase scalar value that is associated with a temporal markers that correspond to time periods within a frame in which the digital character 112 performs corresponding actions and/or motions involved with those actions.

The phase of motion, for instance, may define a particular time within a frame of the animation 110 at which a digital character's 110 left foot lands on the ground, and another time within the frame when the digital character's 110 right foot lands on the ground. For cyclic motions like walking or running, the phase scalar term is defined as one of the values of 0, $\pi$, or $2\pi$. These values are based on a calculation of when a left or right foot of the digital character 112 lands on the surface of the virtual environment. Any movements in between the landing of the left foot and the right foot are calculated based on interpolation. Alternatively, for acyclic movements like sitting, the phase scalar values range from 0 to $2\pi$ for the starting and ending portions of a frame, while the phase scalar values in the middle portions of the frame are calculated based on interpolation.

The term $X'_i$, as defined in the third of the above equations, is also a two-dimensional vector, e.g., a task vector. This task vector may be encoded with data describing an additional action to be performed by the digital character 112 in the second frame 504, a goal position, and a goal orientation of the target action. In one example, an additional action may describe another step taken by the digital character 112 in a different frame (e.g., the second frame 504) towards the target object 612 in order to achieve the target action. The goal position describes a location within the digital environment of the animation 110 at which the target action is to be performed by the digital character 112, and the goal orientation describes direction of the digital character 112 relative to a location at which the target action is to be performed. For example, the goal position may be the location of the chair upon which the digital character 112 is to sit, and the goal orientation may be a direction of the digital character 112 relative to a chair.

The term $t_{i-1}{}^a$ represents an action being performed by the digital character 112 in a current frame (e.g., first frame 502), while the term $g_{i-1}{}^a$ represents a future action (e.g., additional action) to be performed in the next frame, i.e., a second frame. This additional action is one of a plurality of actions that ultimately results in the performance of the target action, e.g., with respect to the target object 612. The term $\delta$ represents a distance scalar value from the digital character 112 to location of the target action, e.g., the distance from the digital character 112 to the target object 612. The term $\theta$ represents an angular scalar value related to the orientation of the target action.

The animation generation system 108 multiplies the values represented by the term $\theta$ and $\delta$ with the value represented by the term $g_{i-1}{}^a$. Thereafter, the determination module 206 performs a Kronecker product operation of the term $P_i$ (the phase of motion vector) and the term $X'_i$ (the task vector). It is noted that both the phase of motion vector and the task vector are two-dimensional vectors. The result of the Kronecker product operation of the phase of motion vector and the task vector are the input features 208 along with action labels specifying actions associated with the first state and the target action, e.g., as a one-hot encoding.

The input features 208 are received by the gating module 210 of the neural state machine 116. An advantage of calculating the input to the gating module 210 as a Kronecker dot product of the values represented by the terms $P_i$ and $X'_i$ is that neural state machine 116 is able to effectively learn distinct cyclic and acyclic phase functions that are suitable to a variety of different movements that can be performed by the digital character 112. This is not possible in conventional automated animation generation techniques that are limited to cycle motions due to an inability to address a phase of motion nor multiple motions and actions together.

Upon receiving input features 208 including phase values of phases of motion corresponding to the first frame 502 and the target action (block 304) along with the action labels, a neural network of the gating module 210 of the neural state machine 116 generates blending coefficients 212 of weights (block 306).

In one example, the input of $X'_i$ for each frame of the digital content calculated by the animation generation system 108 in the manner described above includes data regarding an additional action to be performed by the digital character 112. From this, the gating module 210 generates a plurality of weights of blending coefficients 212, represented by the term $\alpha$. These weights are calculated using a neural network weight configuration defined by the following equation:

$$\alpha = \sum_{i=1}^{K} \omega_i \alpha_i$$

In the above equation, the term K represents a hyperparameter that is adjustable by the animation generation system 108 based on the complexity of the training data. The training data is described in detail in later paragraphs. As the neural state machine 116 is robustly trained to learn and adapt to a wide range of actions, the K value may be set to, e.g., 8 or 10. Alternatively, other values for K are also contemplated. To calculate the weights represented by the term $\alpha$, a weight is calculated for each frame and combined with the hyperparameter and a blending coefficient ($\omega_i$) for that particular frame.

The term $\omega_i$ represents a blending coefficient for a particular frame and is calculated by the gating module 210 using the following equation:

$$\omega = \Omega(\hat{X}; \mu) = \sigma(W'_2 ELU(W'_1 ELU(W'_0 \hat{X} + b'_0) + b'_1) + b'_2)$$
$$\mu = \{W'_0 \in R^{h' \times n'}, W'_1 \in R^{h' \times h'}, W'_2 \in R^{K \times h'}, b'_0 \in R^{h'},$$
$$b'_1 \in R^{h'}, b'_2 \in R^K\}$$

In the first above equations, the term $\hat{X}$ (input features 208) is the input to the gating module 210 that is calculated in the manner described above. In the second of the above equations, the term $\mu$ is defined. Specifically, the term h' represents the number of hidden layer units and is set to 128, the term n' is the input dimension, and the term K represents the hyperparameter as defined above. Finally, the term $\sigma$ is a softmax operator that normalizes the inputs to the gating module 210 such that these inputs, when summed, equal the value of 1. The gating module 210 calculates $\omega$ (blending coefficient) based on the first of the above equations for each frame of the digital content. The generated blending coefficients are then used to modify the expert weights $\alpha_i$ for each frame of the digital content.

Thereafter, for each frame of the digital content, the animation generation system 108 blends one or more weights using respective blending coefficients calculated above. The neural state machine 116 uses the generated blending coefficients 212 of the weights to configure a motion prediction module 214 to predict a second state 216 (e.g., next state) for the digital character 112 (block 308). The blending coefficients of the weights is used to specify neural network parameters, e.g., of at least one neural network 222 of the motion prediction module 214. The neural network parameters, for instance, may describe weights applied to connections between nodes of the neural network 222.

After the motion prediction module 214 is configured using the blending coefficients of weights, this module receives data specifying the target action and the first state from the first frame. This data describes the positions of the various physical joints included as part of this character (e.g., knees, elbows, etc.), and motions involving velocities and rotations associated with one or more of these joints (and other portions of the digital character 112). Moreover, this data also describes previous and future poses for the digital character 112 within a predefined time window. This time window may span for two seconds, during which the digital character 112 may rotate one or more joints at a velocity such that the character performs a motion, e.g., walking, running, sitting, carrying, climbing, etc.

The motion prediction module 214 also receives data about the target action that is to be performed by the digital character 112. For example, this data describes a pose of the digital character 112 as part of the target action, a position of a target object 612 relative to the digital character 112 (if applicable), and the orientation of the digital character 112. In one example, data regarding a position of the target object 612 relative to the digital character 112 may be a virtual distance between the digital character 112 and the target object 612, and the data of the orientation of the target object 612 relative to the digital character 112 may be an angular value, e.g., an angle value that indicates that the digital character 112 is to turn 90 degrees from the character's original position in order to approach the target object 612. Alternatively, the orientation may describe a direction of the digital character 112 relative to the location where the target action is to be performed. The data describing a pose of the digital character 112 may be that the digital character 112 standing in, e.g., an upright position.

Additionally, in another example, the motion prediction module 214 may receive additional data, such as data describing an environment of the digital character 112, a target object geometry of the target object 612, and so forth. For example, the animation generation system 108 may receive data describing a proximity between the digital character 112 and an object (e.g., a table) within a virtual environment of the animation 110. Based on this data, the animation generation system 108 determines that the particular object is within a vicinity of the digital character 112. Thereafter, based on the target action, the animation generation system 108 determines whether the digital character 112 is to interact with or avoid this object (the chair). In another example, if the specified target action is to sit in a chair, the animation generation system 108 determines that a table is within the vicinity of the digital character 112, and provides an instruction to the digital character 112 to avoid interacting with the table, as the specified action to be performed involves the chair and not the table.

Returning to second stage 604 of FIG. 6, given the digital character 112 in the first stage 602 of FIG. 6, the motion prediction module 214 predicts the second state 216 for the digital character 112 in the second frame 504 of the digital content based on data describing the first state and the target action (block 310) using a neural network configured accordingly to the blending coefficients as described above.

The motion prediction module 214, for instance, may include at least one neural network 222, trained to make a prediction based on a respective type of action (e.g., walking), motion involved in the action (e.g., arm or leg movement as part of walking), characteristics associated with the action or motion (e.g., characteristics of the environment, digital objects, geometries, etc.), and so forth. The neural network is configured based on the blending coefficients as described above.

In this example, as the specified target action is "SIT IN CHAIR," the motion prediction module 214 predicts that the second state involves an intermediate action for the digital character 112 involves taking a diagonal step in a particular direction. This intermediate action is predicted by the motion prediction module 214 based on a posture of the digital character 112 in first frame 502 as depicted in first stage 602, a goal action to be performed in the next frame, an orientation of the target object 612 relative to the character, and the position of the target object 612 relative to the digital character 112. In another example, an environment of the digital character in a particular state as included in a particular frame is also a factor. In the first frame 502, the digital character 112 is standing a few feet away from the target object 612 (the chair), which is located directly in the path of the digital character 112. As such, the motion prediction module 214 predicts that, in order to perform the target action of sitting in the chair, the digital character 112 is to perform an action of taking a diagonal step to, e.g., ensure that the chair is not in the immediate path of the digital character.

From this, the animation module 218 generates a second frame subsequent to the first frame that depicts the digital character according to the second state (block 312). The animation of the digital character 112 is then output as having the first and second frames (block 314). The animation module 218, for instance, animates the digital character 112 to take a diagonal step. Thereafter, the display device 220 of the animation generation system 108 outputs the animation 110 of the digital character 112 having the second state 216, as depicted in second stage 604 of FIG. 6A.

The prediction of the second state 216 that is output from the motion prediction module 214 is then fed back into the neural state machine 116, which utilizes the gating module 210 and the motion prediction module 214 of the neural state machine 116 to predict yet another state of the digital character 112 in the digital content to continue generation of the animation 110. Thus, the output from the motion prediction module 214 for a state of the digital character 112 in a particular frame serves as an input into the neural state machine 116 to predict a state of the digital character 112 in the immediately following frame of the animation 110 until the target action is achieved.

At the third stage 606 in FIG. 6B, the data describing the state of the digital character 112 involves a pose of the digital character 112 in a third state. This is shown in which the digital character 112 takes a step in a direction that is parallel to the target object 612. At the fourth stage 608, a fourth state is predicted and used to generate a corresponding fourth frame of the animation 110 in which the digital character 112 begins transitioning from a walking action to the sitting action. Finally, at the fifth stage of 610, the digital character 112 is shown as completing the target action of sitting in the chair.

Figure 7:
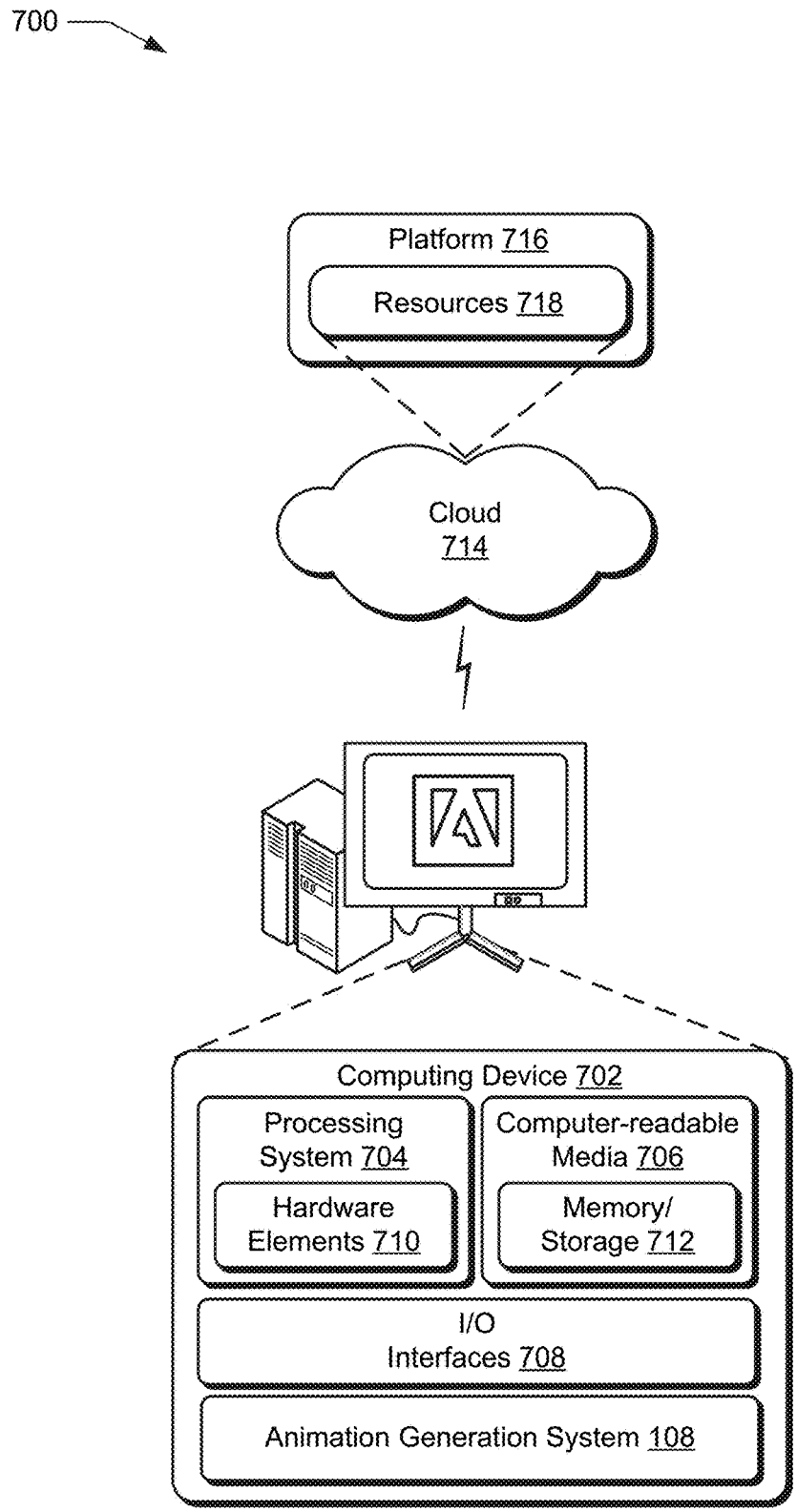
FIG. 7 illustrates an example system generally at that includes an example computing device that is representative of one or more computing systems and/or devices that may implement the various techniques described herein.

In this way, the animation generation system 108 autoregressively generates an animation 110 using the neural state machine 116 in which the digital character 112 performs a target action with respect to the target object 612. In this way, the animation generation system 108 generates animations in which digital characters perform complex set of actions in a precise and realistic manner. Moreover, the animation generation system 108 generates the animations in a computationally efficient manner Example System and Device FIG. 7 illustrates an example system generally at 700 that includes an example computing device 702 that is representative of one or more computing systems and/or devices that may implement the various techniques described herein as illustrated through inclusion of the animation generation system 108. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 102 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

What is claimed is:

1. In a digital medium automated animation generation environment, a method implemented by a computing device, the method comprising:
   displaying, by the computing device in a user interface, a digital character included within a virtual environment and a plurality of representations of target actions;
   receiving, by the computing device, an input via the user interface selecting at least one said representation of a respective said target action;
   obtaining, by the computing device responsive to the receiving, input features defining phase values of phases of motion corresponding to a first state of a first frame and the respective said target action selected via the input to be performed by the digital character as part of an animation;
   generating, by the computing device, blending coefficients of weights using a neural network based on the input features;
   predicting, by the computing device, a second state for the digital character based on the input features by a motion prediction module, the motion prediction module having neural network parameters configured based on the blending coefficients of weights;
   generating, by the computing device, a second frame subsequent to the first frame, the second frame depicting the digital character in the second state; and
   displaying, by the computing device, the animation of the digital character in the user interface, the animation including the first and second frames.

2. The method as described in claim 1, further comprising computing the input features based on a first vector that includes labeled phase scalar with a second vector defining a current action associated with the first state and a goal position, goal orientation, goal action, and trajectory associated with the target action.

3. The method as described in claim 2, wherein the goal position associated with the target action describes a location at which the target action is to be performed.

4. The method as described in claim 2, wherein the goal orientation associated with the target action describes a direction of the digital character relative to a location at which the target action is to be performed.

5. The method as described in claim 2, where the first vector is a two-dimensional phase vector.

6. The method as described in claim 1, wherein the target action is acyclic.

7. The method as described in claim 1, wherein the target action is a complex action that includes interaction with a digital object in an environment defined by the animation.

8. The method as described in claim 1, wherein the generating of the blending coefficients by the neural network includes learning a multi-modal phase function.

9. The method as described in claim 1, wherein the motion prediction module predicts an action, motion, or action characteristic.

10. The method as described in claim 1, wherein the first state and the second state define respective poses of the digital character.

11. The method as described in claim 1, further comprising:
    generating, by the computing device, a second set of blending coefficients of weights using the neural network based on the second state and the target action;
    configuring, by the computing device, a second set of neural network parameters for the motion prediction module, the configuring based on the second set of blending coefficients of weights;
    predicting, by the computing device, a third state for the digital character based on the second set of neural network parameters by the motion prediction module:
    generating, by the computing device, a third frame subsequent to the second frame, the third frame depicting the digital character in the third state; and
    wherein the displaying the animation includes the first, second, and third frames.

12. In a digital medium automated animation generation environment, a system comprising:
    an input module implemented by a computing device to:

receive an input selecting a representation of a target action displayed in a user interface; and obtain input features defining phase values of phases of motion corresponding to a first state of a first frame and the target action to be performed by a digital character as part of an animation;

a gating module implemented by a neural network of a computing device to generate blending coefficients of weights using a neural network based on input features;

a motion prediction module implemented by the computing device to configure neural network parameters based on the blending coefficients of weights and predict a second state for the digital character by processing the first state and the target action using the neural network parameters; and an animation module implemented by the computing device to generate an animation including the first frame and a second frame, the second frame having the digital character in the second state.

13. The system as described in claim 12, wherein the target action is acyclic.

14. The system as described in claim 12, wherein the target action is a complex action that includes interaction with a digital object in an environment defined by the animation.

15. The system as described in claim 12, wherein the gating module generates the blending coefficients by the neural network by learning a multi-modal phase function.

16. The system as described in claim 12, wherein the motion prediction module predicts an action, motion, or action characteristic.

17. The system as described in claim 12, wherein the input features are calculated based on a first vector that includes labeled phase scalar with a second vector defining a current action associated with the first state and a goal position, goal orientation, goal action, and trajectory associated with the target action.

18. The system as described in claim 12, wherein the first state and the second state define respective poses of the digital character.

19. In a digital medium automated animation generation environment, a system comprising:

a processing system; and a computer-readable storage medium having instructions stored thereon that, responsive to execution by the processing system, causes the processing system to perform operations including:

receiving an input via a user interface selecting at a representation of a plurality of representations of target actions;

obtaining input features defining phase values of phases of motion corresponding to a first state of a first frame and a target action selected via the input to be performed by a digital character as part of an animation;

generating blending coefficients of weights using a neural network based on the input features;

predicting a second state for the digital character based on the input features by a neural network having neural network parameters configured based on the blending coefficients of weights;

generating a second frame subsequent to the first frame, the second frame depicting the digital character in the second state; and displaying the animation of the digital character in the user interface, the animation including the first and second frames.

20. The system as described in claim 19, wherein the input features are calculated using a Kronecker dot product.

* * * * *